United States Patent [19]
Hooper et al.

[11] Patent Number: 5,734,980
[45] Date of Patent: Mar. 31, 1998

[54] PREFERRED SYSTEM SELECTION TECHNIQUES FOR MOBILE TERMINALS

[75] Inventors: Jeff Duwayne Hooper, Garland; Daniel G. Collins, Plano, both of Tex.

[73] Assignee: Ericsson Inc., Richardson, Tex.

[21] Appl. No.: 381,105

[22] Filed: Jan. 31, 1995

[51] Int. Cl.⁶ .................................................. H04Q 7/20
[52] U.S. Cl. .................................. 455/434; 455/432
[58] Field of Search .................................. 455/33.1, 33.4, 455/54.1, 54.2, 56.1, 62, 166.1, 166.2, 432, 433, 434, 517, 524; 379/58, 59

[56] References Cited

U.S. PATENT DOCUMENTS

| | | | |
|---|---|---|---|
| 4,144,409 | 3/1979 | Utano et al. | 179/2 |
| 4,876,738 | 10/1989 | Selby | 455/33 |
| 5,125,103 | 6/1992 | Grube et al. | 379/59 |
| 5,153,902 | 10/1992 | Buhl et al. | 379/57 |
| 5,159,625 | 10/1992 | Zicker | 379/59 |
| 5,260,987 | 11/1993 | Mauger | 379/58 |
| 5,260,988 | 11/1993 | Schellinger et al. | 379/59 |
| 5,261,117 | 11/1993 | Olson | 455/54.2 |
| 5,276,905 | 1/1994 | Hurst et al. | 455/33.1 |
| 5,303,237 | 4/1994 | Bergman et al. | 370/85.6 |
| 5,305,466 | 4/1994 | Taketsugu | 455/33.1 |
| 5,335,255 | 8/1994 | Seppi et al. | 378/4 |
| 5,337,344 | 8/1994 | Alvesale | 379/58 |
| 5,517,677 | 5/1996 | Moon | 455/33.1 |
| 5,590,397 | 12/1996 | Kojima | 455/33.1 |

*Primary Examiner*—Edward F. Urban
*Attorney, Agent, or Firm*—Jenkens & Gilchrist

[57] ABSTRACT

Method for selecting a preferred system for wireless communications with a mobile terminal or subscriber. To select a preferred system for wireless communications with a mobile terminal or subscriber using a mobile terminal, a range of operating frequencies are scanned to detect wireless systems. Each time a wireless system is detected, a determination is made as to whether the detected wireless system is a most preferred system or a lesser preferred system for the mobile terminal or subscriber. If the detected wireless system is determined to be the most preferred system, scanning is terminated and the detected wireless system is selected for wireless. If, however, the detected wireless system is determined to be one of the lesser preferred systems, selection information for the detected wireless system is stored in a memory subsystem of the mobile terminal and scanning continues. Upon completion of the scanning, if no wireless system has been selected as the most preferred system, a highest ranking lesser preferred system is selected using the selection information stored in the memory subsystem for wireless communications.

7 Claims, 3 Drawing Sheets

PREFERRED SYSTEM SELECTION TECHNIQUES FOR MOBILE TERMINALS

BACKGROUND OF THE INVENTION

1. Field of the Invention

The present invention generally relates to enhancing the ability of a mobile terminal to select a system through which wireless communications will be handled and, more particularly, to a technique for mobile terminal selection of a preferred wireless communication system from those available within a particular service area.

2. Description of Related Art

In order to transmit or receive wireless communications, a mobile terminal must exchange a series of messages with a local service provider or "system". In the past, the ability of a mobile terminal to select a system with which wireless communications are to be established has been quite limited. Furthermore, as only one or two systems were available in a geographical area, the industry rarely perceived a need to equip mobile terminals with any sophisticated system selectivity features. For example, all "cellular" communication systems operate within a relatively narrow frequency band commonly referred to as the 800 MHz frequency band. Two systems operate at different frequencies within this band—the "A" cellular system and the "B" cellular system. In a given locality, the A (or "non-wireline") cellular system is operated by a service provider specializing in cellular services while the B (or "wireline") cellular system is operated by a service provider who also offers wireline services in the locality.

When a person purchases a cellular phone, he or she subscribes with one of these service providers. The selected service provider is designated as the "home system" for the cellular phone and the phone is programmed to prefer operation at the frequency range, either A or B, at which the home system operates. Whenever the cellular phone is turned on, the phone will register with the home system. If the user "roams", i.e., turns on the cellular phone outside of the geographical area serviced by his or her home system, the cellular phone will first attempt to register with the local system, either A or B, which matches its home system. If a matching system is unavailable, the cellular phone can then attempt to register with the non-matching system.

The aforementioned selection techniques, commonly referred to as "A/B selection" and "B/A selection", respectively, presumes that it is always preferable to select one class of systems over the other. No consideration is given as to whether it would be more advantageous to select the A system when roaming in a first geographical area but avoid the A system when roaming in a second geographical area. U.S. Pat. No. 5,159,625 to Zwicker discloses a method by which a terminal is able to avoid selecting undesired systems. In Zwicker, a list of undesired systems is stored in the cellular telephone. The phone is programmed with a default preference, either A or B. Whenever the phone roams, the phone will first attempt to select the local system corresponding to its default preference. If, however, the local system corresponding to the default preference is on the list of undesired systems, the phone is then instructed to communicate with the other system.

The incorporation of system selectivity features into mobile terminals is further complicated by recent developments in wireless communications. Specifically, the anticipated entry of PCS systems operating within a band of frequencies generally referred to as the 1900 MHz band, is expected to add six or more additional service providers to each geographical area.

As the number of competing systems which are available within a geographical area increases, terminals will need greater system selectivity than that presently available. For example, a service provider may have acquired cellular systems in a limited number of geographical areas but was unable to acquire cellular systems in other geographical areas. By acquiring newly available PCS systems, the service provider may expand into new geographical areas. While the service provider would prefer that their subscribers always use their systems whenever available, if the service provider has different types of systems in different geographical areas, for example, an A cellular system in a first geographical area and an A PCS system in a second geographical area, such usages are not provided for the subscriber without the terminal being equipped with system selectivity features significantly more sophisticated than those described above.

The development of interoperable terminals is expected to further complicate the task of providing system selectivity. Presently, three standards dominate wireless communications—IS-136 (which superseded IS-54) and IS-95 in the United States and GSM in Europe. Traditionally, a system would conform to one of these standards and only terminals conforming to that standard were able to register with that system. As interoperable terminals, i.e. terminals capable of conforming to plural standards, become available, it becomes increasingly likely that systems conforming to various operating standards will be available within a single geographical area. For example, systems conforming to a GSM-based operating standard may be located within the United States. In this scenario, it may be advantageous if an interoperable terminal could select between IS-95, IS-136 and GSM-based systems available within a geographical area.

The incorporation of preferred system selection techniques into the various operating standards has been inconsistent. Neither the IS-95 nor the IS-136 standard provides an automated process for preferred system selection. While GSM provides for the selection of a preferred system, the existing process is quite inefficient and best suited for selecting between a relatively limited number of available systems. In accordance with the existing GSM preferred system selection technique, a list of systems are stored in a mobile terminal in order of preference. When the mobile terminal is turned on or otherwise reset, the terminal will scan for a first available system. The terminal identifies the scanned system and checks the placement of the identified system on the list of systems. If the system is the highest ranking system on the list, the system will then be selected for use. If, however, the system is not the highest ranking system on the list, the terminal will reject the system and scan for a next available system. Each available system is checked against the preference list and will only be selected if it is the highest ranking system on the list. If none of the available systems are identified as the highest ranking system on the list, the terminal will then repeat the scanning process, this time, comparing each available system to the second highest system on the list. The process continues until a scanned system is matched to a listed system. In this manner, a terminal operating in a GSM-based network will always select the highest ranking available system for use.

It can be readily seen from the foregoing that it would be desirable to provide a technique with which a mobile terminal may efficiently select a preferred system for wireless communications in a geographical area in which any number of systems are available for selection. It would be further desirable to provide a preferred system selection technique for mobile terminals which is compatible with IS-95, IS-136 and GSM-based standards, or any combination thereof. It is, therefore, the object of this invention to provide such a technique.

SUMMARY OF THE INVENTION

In one embodiment, the present invention is of a method for mobile terminal selection of a preferred system for wireless communications therewith. A range of operating frequencies are scanned to detect wireless systems operating within that range. Each time a wireless system is detected, a determination is made as to whether the detected wireless system is a most preferred system or one of a plurality of lesser preferred systems for the mobile terminal. If the detected wireless system is determined to be the most preferred system for the mobile terminal, scanning is terminated and the detected wireless system is selected for wireless communications with the mobile terminal. If, however, the detected wireless system is determined to be one of the lesser preferred systems for the mobile terminal, selection information for the detected wireless system is stored in a memory subsystem of the mobile terminal and scanning continues. Upon completion of the scanning, if no detected wireless system has been determined to be the most preferred system for the mobile terminal, a highest ranking lesser preferred system is selected using the selection information stored in the memory subsystem for wireless communications with the mobile terminal.

In further aspects of this embodiment of the invention, a system identifier and a rank for the most preferred system and each one of the lesser preferred systems are stored in the memory subsystem of the mobile terminal. The detected wireless system may then be determined to be the most preferred system for the mobile terminal by acquiring a system identifier for the detected wireless system and comparing the acquired system identifier to the system identifier for the most preferred system. If the acquired system identifier matches the system identifier for the most preferred system, it is determined that the detected wireless system is the most preferred system. Likewise, the detected wireless system may be determined to be one of the lesser preferred systems for the mobile terminal by comparing the acquired system identifier to the system identifiers for the lesser preferred systems. If the acquired system identifier matches the system identifier for one of the lesser preferred systems, it is determined that the detected wireless system is one of the lesser preferred systems. In a yet further aspect of this embodiment of the invention, the selection information stored in the memory subsystem which is used to select the highest ranking lesser preferred system may include both the ranks of the detected wireless systems as well as the frequencies at which they transmit.

In various further aspects thereof, the mobile terminal may operate in accordance with one or more operating standards which include IS-95, IS-136 and GSM-based standards, the system identifier for the most preferred system and the lesser preferred systems may be a MCC/MNC value, a NID value or a PSID value and the range of operating frequencies to be scanned may include a first range of frequencies in which cellular systems operate and a second range of frequencies in which PCS systems operate. In a still further aspect thereof, each time a wireless system is detected, a determination is made as to whether the detected wireless system is operating in accordance with one of the one or more operating standards in which the mobile terminal may operate. If it is determined that the detected wireless system is not operating in accordance with one of the one or more operating standards in which the mobile terminal may operate, the detected wireless system is ignored and scanning of the range of frequencies continues.

In another aspect thereof, prior to scanning the range of operating frequencies, the method scans a home frequency to detect wireless systems operating thereat. If a wireless system operating at the home frequency is detected, a determination is made as to whether the detected wireless system is a home system for the mobile terminal. If the detected wireless system operating at the home frequency is determined to be the home system for the mobile terminal, the home system is selected for wireless communications with the mobile terminal. If the detected wireless system operating at the home frequency is determined to not be the home system, a determination is made as to whether the detected wireless system operating at the home frequency is the most preferred system or one of the lesser preferred systems for the mobile terminal. If the detected wireless system operating at the home frequency is determined to be the most preferred system for the mobile terminal, the detected wireless system operating at the home frequency is selected for wireless communications with the mobile terminal. If the detected wireless system operating at the home frequency is determined to be one of the lesser preferred systems for the mobile terminal, selection information for the detected wireless system operating at the home frequency is stored in the memory subsystem of the mobile terminal.

In another embodiment, the present invention is of a method for subscriber selection of a preferred system for wireless communications between a preferred system and a multiple subscriber mobile terminal constructed to receive a user interface module. A user interface module having a system identifier and a rank for a most preferred system and each one of a plurality of lesser preferred systems stored therein is inserted into the multiple subscriber mobile terminal to transfer the system identifier and the rank for the most preferred system and each one of the plurality of lesser preferred systems to the memory subsystem of the multiple subscriber mobile terminal. A range of operating frequencies are then scanned to detect wireless systems operating within the range of frequencies. Each time a wireless system is detected during the scanning, a determination is made as to whether the detected wireless system is the most preferred system or one of the plurality of lesser preferred systems for the subscriber. If the detected wireless system is determined to be the most preferred system for the subscriber, scanning is terminated and the most preferred system is selected for wireless communications with the multiple subscriber mobile terminal. If, however, the detected wireless system is determined to be one of the plurality of lesser preferred systems for the subscriber, selection information for the detected wireless system is stored in the memory subsystem of the multiple subscriber mobile terminal. If no detected wireless system has been determined to be the most preferred system for the subscriber upon completion of scanning, a highest ranking lesser preferred system is selected for wireless communications with the multiple subscriber mobile terminal using the selection information stored in the memory subsystem.

In one aspect thereof, a system identifier is acquired for the detected wireless system and compared to the system identifier for the most preferred system. If the acquired system identifier matches the system identifier for the most preferred system, the detected wireless system is determined to be the most preferred system for the subscriber. In a related aspect thereof, the acquired system identifier is compared to the system identifier for each one of the plurality of lesser preferred systems. If the acquired system identifier matches the system identifier for one of the plurality of lesser preferred systems, the detected wireless system is determined to be one of the plurality of lesser preferred systems. In another related aspect thereof, an operating frequency at which the detected wireless system transmits and the rank of the detected wireless system is stored in the memory subsystem of the multiple subscriber mobile terminal.

In another aspect of this embodiment of the invention, the range of frequencies is stored in the user interface module and transmitted to the memory subsystem of the multiple subscriber mobile terminal upon insertion of the user interface module into the multiple subscriber mobile terminal. In a related aspect thereof, a home frequency is also stored in the user interface module and transmitted to the memory subsystem of the multiple subscriber mobile terminal upon insertion of the user interface module into the multiple subscriber mobile terminal. In this aspect of the invention, the home frequency is scanned prior to the scanning of the range of operating frequencies to detect wireless systems operating at the home frequency. If a wireless system is detected operating at the home frequency, a determination is made as to whether the detected wireless system is a home system for the subscriber. If the detected wireless system operating at the home frequency is determined to be the home system for the subscriber, that system is selected for wireless communications with the multiple subscriber mobile terminal. If, however, the detected wireless system operating at the home frequency is determined to not be the home system for the subscriber, a determination is then made as to whether the detected wireless system operating at the home frequency is the most preferred system or one of the plurality of lesser preferred systems for the subscriber. If the detected wireless system operating at the home frequency is determined to be the most preferred system for the subscriber, the detected wireless system is selected for wireless communications with the multiple subscriber mobile terminal. If, however, the detected wireless system operating at the home frequency is determined to be one of the plurality of lesser preferred systems for the subscriber, selection information for that system is stored in the memory subsystem of the multiple subscriber mobile terminal.

BRIEF DESCRIPTION OF THE DRAWING

The present invention may be better understood, and its numerous objects, features and advantages will become apparent to those skilled in the art by reference to the accompanying drawing, in which.

DETAILED DESCRIPTION

Figure 1:
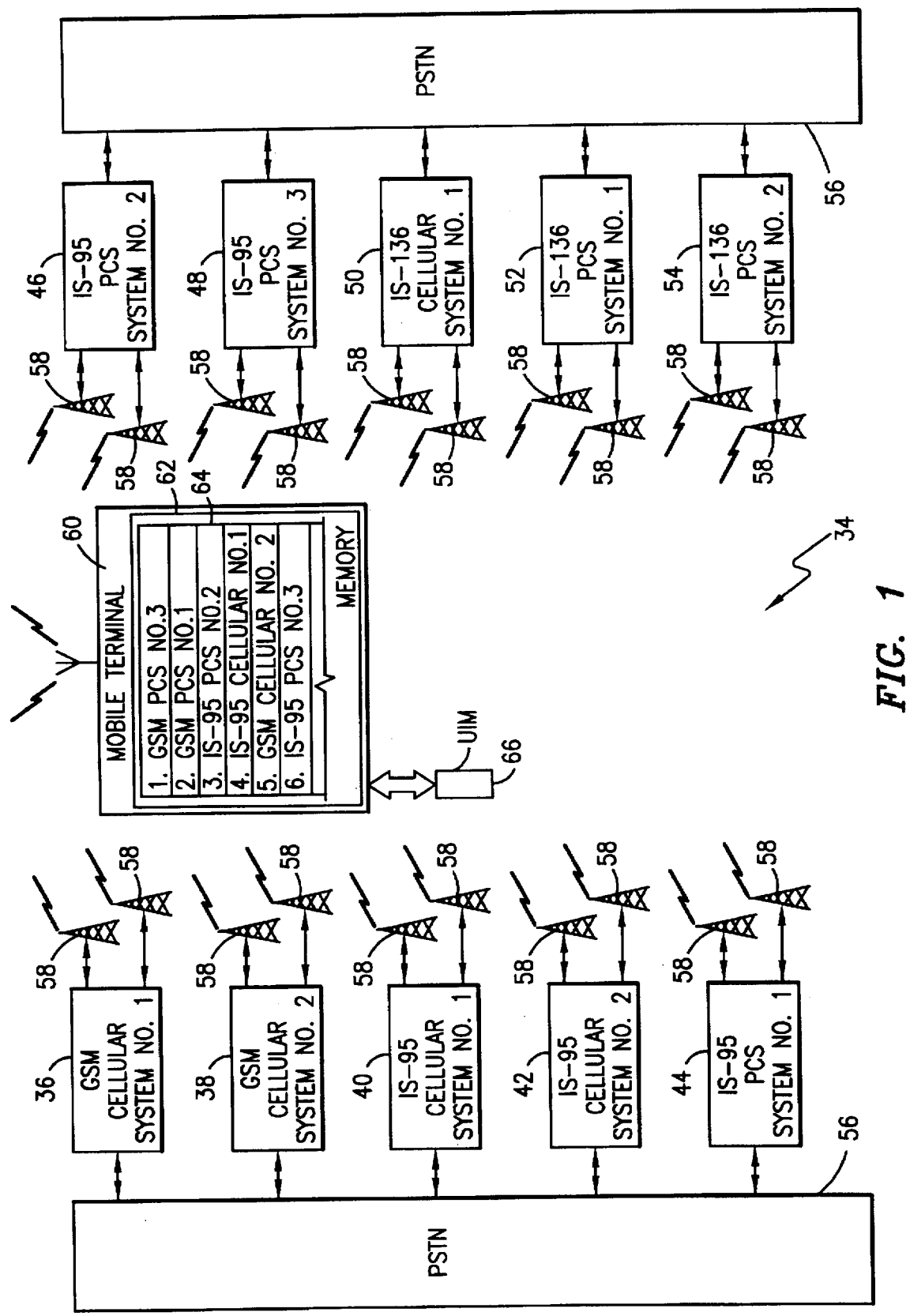
FIG. 1 is a block diagram of a wireless communications environment.

Referring first to FIG. 1, a wireless communications environment 34 for a selected geographical area may now be seen. Operating within the wireless communications environment 34 are plural wireless systems 36, 38, 40, 42, 44, 46, 48, 50, 52 and 54. Each wireless system 36 through 54 are coupled to the public switched telephone network (or "PSTN") 56 and to one or more base stations 58 located within the service area of the respective wireless systems 36 through 54 to accomplish exchanges of voice or data messages between a first mobile terminal and either a second mobile terminal or a wireline terminal coupled to the PSTN 56. The specific techniques by which a wireless system accomplishes such exchanges of voice or data messages are well known in the art and need not be described in greater detail herein.

The wireless communications environment 34 includes cellular and PCS systems operating in accordance with various standards. More specifically, the wireless systems 36 and 38 are first and second cellular systems operating in accordance with a GSM-based standard. Wireless systems 40 and 42 are first and second cellular systems operating in accordance with the IS-95 standard and wireless system 50 is a cellular system operating in accordance with the IS-136 standard. Wireless system 44, 46 and 48 are first, second and third PCS systems operating in accordance with the IS-95 standard and wireless systems 52 and 54 are first and second PCS systems operating in accordance with the IS-136 standard. While not specifically illustrated herein, it should be clearly understood that the wireless operating environment 34 may include any number of cellular or PCS systems operating in accordance with IS-95, IS-136 or GSM-based standards. It is further contemplated that wireless operating system 34 may further include wireless systems operating within frequency bands other than the cellular and PCS bands or in accordance with other operating standards.

A mobile terminal 60 is located within the wireless operating environment 34. The mobile terminal 60 may either be configured for exclusive operations with cellular or PCS systems or, as illustrated herein, interoperable with both. The mobile terminal may be further configured in accordance with either IS-95, IS-136 or a GSM-based standard or, as illustrated herein, interoperable with each of these standards. Again, it should be clearly understood that it is further contemplated that the mobile terminal 60 may also be operable within frequency bands other than the cellular and PCS bands as well as operable in accordance with other operating standards than those specifically enumerated herein.

The mobile terminal 60 includes a random access memory (or "RAM") type memory subsystem 62 in which semi-permanent numeric access memory (or "NAM") information necessary for the mobile terminal 60 to exchange messages with a selected cellular system is stored. Among the information includes as part of the NAM information are a mobile identification number (or "MIN") as well as a home system identification number (or "SID") if the home system for the mobile terminal 60 conforms to the IS-95 or IS-136 standards or mobile country code (or "MCC") and mobile network code (or "MNC") values if the home system for the mobile terminal 60 conforms to a GSM-based standard. Also stored in the memory subsystem 62 is a preferred system selection list 64. The list 64 identifies plural wireless systems ranked in order of preference, i.e., the relative desirability of selecting a particular available wireless system for exchanging messages with the mobile terminal 60. Each system included on the list 64 includes a rank, for example, #1, #2, #3, etc., which identifies the preferability of the system relative to the other systems included on the list and system identification information which may be used to uniquely identify the system. The highest ranking system included on the list 64 is the "most preferred" system while the remaining systems on the list 64 are "lesser preferred" systems ranked in order of descending preferability.

For non-interoperable mobile terminals, i.e., mobile terminals operable in accordance with a single standard, the list 64 will contain plural systems which operate in accordance with that standard. For interoperable terminals such as the mobile terminal 60, the list 64 may contain systems which operate in different standards. For example, the list 64 includes three GSM-based systems, No. 2 cellular, No. 1 PCS and No. 3 PCS and three IS-95 systems, No. 1 cellular, No. 2 PCS and No. 3 PCS. As previously mentioned, for each system included on the list 64, a ranking and system identification information which uniquely identifies each system on the list 64 are stored in memory. GSM-based systems may be uniquely identified by the combined MCC/MNC values while IS-95 and IS-136 systems may be uniquely identified by their SID value or other appropriate identifier.

As will be more fully described below, and in accordance with the teachings of the present invention, the mobile terminal 60 periodically scans a preselected range of frequencies to detect available systems, for example, whenever turned on, reset or upon expiration of a preselected time period (if tuned to a system other than the most preferred system), and selects a preferred system for wireless communications therewith. More specifically, upon determining that it is available, the mobile terminal 60 will select the most preferred system from the list 64. If the most preferred system is unavailable, the mobile terminal 60 will select the highest ranking lesser preferred system which is determined to be available. If none of the systems included on the list 64 are available, the mobile terminal 60 will select a default system.

Figure 2:
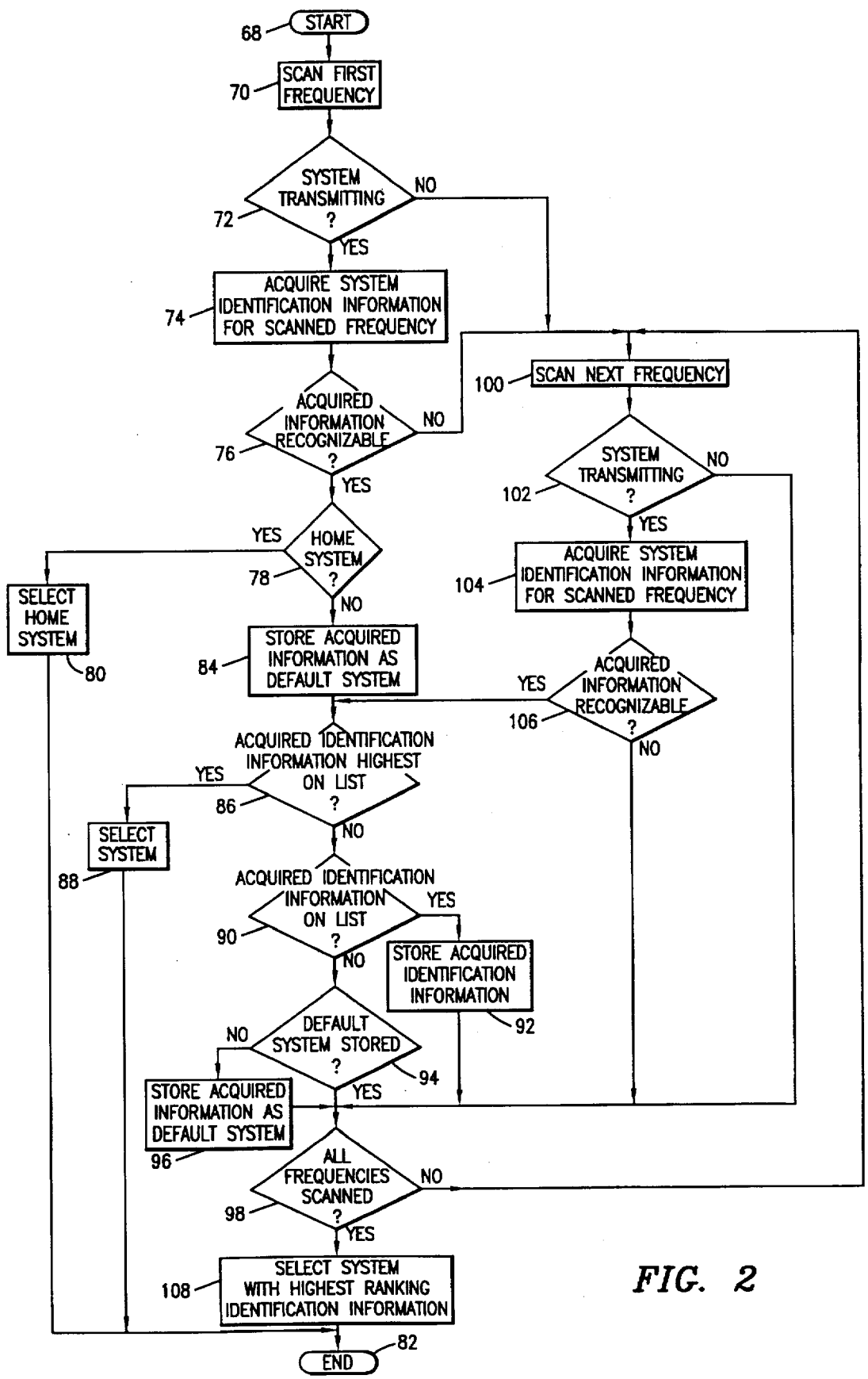
FIG. 2 is a flow chart of a method for mobile terminal selection of a preferred wireless communication system.

Referring next to FIG. 2, the method of selecting a preferred system in accordance with the teachings of the present invention will now be described in greater detail. The method commences at step 68. Initiation of the selection of a preferred system may be accomplished in various ways which include turning on or resetting the mobile terminal 60, detection of a loss of signal from a presently selected preferred system or upon the expiration of a preselected time period since the previous selection of a preferred system.

Proceeding to step 70, the mobile terminal 60 scans a first frequency of a preselected frequency range for periodic transmissions by a wireless system operating at that frequency. The term "frequency range" is intended to encompass both a continuous frequency range which is scanned at regular intervals or to a discontinuous frequency range which may be comprised of a combination of selected frequencies and/or ranges. For example, the frequency range may be comprised of the 800 MHz cellular band and the 1900 MHz PCS band. Furthermore, while the first frequency within the frequency range to be scanned may be a frequency which bounds the frequency range at one end, it is preferred that the first frequency to be scanned is the mobile terminal's "home frequency", i.e. the frequency at which the home system for the mobile terminal 60 transmits.

Continuing on to step 72, if the mobile terminal detects a transmission by a wireless system at the home frequency, the method proceeds to step 74 where the mobile terminal 60 acquires system identification information from the system transmitting at the first frequency and on to step 76, where the mobile terminal 60 begins to process the acquired system identification information. If, however, the mobile terminal 60 fails to detect a transmission by a wireless system at the home frequency, the method proceeds to step 96 where a next frequency is scanned.

Returning momentarily to step 76, the mobile terminal 60 begins processing of the acquired system identification information by first determining if the acquired system identification information is recognizable. As previously stated, systems may operate in accordance with any one of plural operating standards. If a mobile terminal 60 has been programmed to operate in accordance that standard, the system identification information acquired by the mobile terminal 60 will be recognizable. Similarly, interoperable mobile terminals are able to recognize system identification information for each standard for which they have been programmed. If, however, the mobile terminal 60 has not been programmed to operate in accordance with a particular standard, the acquired system identification information will be unrecognizable.

Accordingly, at step 76, if the acquired information is recognizable, the method proceeds to step 78 where it is determined whether the acquired system identification information indicates that the mobile terminal 60 is operating in the geographical area covered by its home system. More specifically, regardless of the standard to which a system conforms, the periodic signal transmitted by all systems includes a value which may be used to uniquely identify the transmitting system. Thus, at step 78, the value of that portion of the recognizable acquired system identification information which uniquely identifies the transmitting system is compared to the value of the corresponding number assigned to the home system for the mobile terminal. If the value of that portion of the recognizable acquired sytem identification information which uniquely identifies the transmitting system matches the value of the corresponding number assigned to the home system for the mobile terminal 60, the method determines at step 78 that the mobile terminal is located within the geographical area covered by its home system. The method then proceeds to step 80 where the mobile terminal 60 selects its home system for wireless communications and ends at step 82 by locking onto the selected system.

Returning now to step 78, if the mobile terminal 60 determines that the recognizable system identification information indicates that the signal acquired at the first frequency was not transmitted by its home system, i.e., the value of the acquired system identification information does not match the value of the system identifier for the home system, the mobile terminal 60 determines that it is "roaming", i.e., is located in a geographical area outside of the area covered by its home system. The method then proceeds to step 84 where the roaming mobile terminal 60 will initiate selection of a preferred system other than its home system at step 84.

The methods described herein presume that the mobile terminal 60 will acquire system identification information for either its home system or at least one ranked preferred system. It is recognized, however, that it is entirely possible that the mobile terminal 60 will fail to acquire system identification information for either its home system or a ranked preferred system. Accordingly, it is necessary to provide a default system selection, i.e., a system which will be selected if neither the home system, the most preferred system nor any of the lesser preferred systems are available. Thus, in accordance with the method disclosed herein, selection of a most preferred system commences at step 84 with the designation of a default system selection. If recognizable system identification information is acquired at the home system frequency for the mobile terminal and, the mobile terminal 60 determines at step 78 that the acquired system identification information was not transmitted by its home system, at step 84, the acquired system identification information and the frequency at which the system identification information was acquired are stored in a default system register located within the memory subsystem 62.

Proceeding to step 86, the mobile terminal 60 compares the acquired system identification information to the system identification information stored in memory for the highest ranking. If it is determined at step 86 that the acquired system identification information matches the system identification information for the highest ranking system on the list 64 stored in the memory subsystem 62, the method proceeds to step 88 where the mobile terminal 60 selects the highest ranking, i.e. most preferred, system for engaging in wireless communications therewith and ends at step 82 by locking onto the most preferred system.

Returning now to step 86, if it is determined that the acquired system identification information does not match the system identification information for the highest ranking system on the list 64 stored in the memory subsystem 62, the method proceeds to step 90 where the acquired system identification information is compared to the system identification information for the remaining, i.e., lesser preferred, systems on the list 64. If the acquired system identification information matches the system identification information for one of the lesser preferred systems on the list 64, the method proceeds to step 92 where the scanned frequency and the acquired system identification information is stored in the memory subsystem 62 in one of plural lesser preferred system registers provided in the memory subsystem 62 and continues on to step 98 where the mobile terminal 60 determines if the entire frequency range has been scanned for additional lesser preferred systems on the list 64 contained on the list.

Returning momentarily to step 90, if, however, the acquired system identification information does not match the system identification information for any of the lesser preferred systems on the list 64, the method proceeds to step 94 where a determination is made as to whether a default system has been selected. If a default system has already been selected, i.e., a scanning frequency and acquired system identification information has been stored in the default register of the memory subsystem 62, the method proceeds to step 98 where the mobile terminal 60 determines if the entire frequency range has been scanned for additional lesser preferred systems on the list 64. If, however, the default register is empty, the scanning frequency and system identification information for the acquired system are stored in the default system register at step 96 before proceeding on to step 98.

After storing the scanned frequency and the acquired system identification information for an acquired system which matches a lesser preferred system on the list 64 at step 92, or after it is determined at step 90 that the acquired system identification information does not match any lesser preferred system on the list 64 and it is determined at step 94 that a default system has already been stored in memory, or, after the acquired system identification information which fails to match any of the lesser preferred systems on list 64 has been stored in memory as the default system, the method proceeds to step 98 where it is determined if all of the frequencies within the selected frequency range have been scanned for lesser preferred systems contained on the list 64.

If it is determined at step 98 that there are remaining frequencies within the frequency range to be scanned for lesser preferred systems, or if it was previously determined at step 72 that no system is transmitting at the first frequency, or if it was previously determined at step 76 that the system identification information acquired at the first frequency was unrecognizable, the method proceeds to step 100 where a next frequency within the selected frequency range is selected and scanned for periodic transmissions by a system. As previously mentioned, the next frequency to be scanned may be a preselected interval, for example, 0.2 MHz, from the previously scanned frequency or may be a discontinuous frequency, i.e., a frequency which is not within a preselected interval from the previously scanned frequency. For example, if the previously scanned frequency was the home frequency for the mobile terminal 60, the next frequency to be scanned may be a frequency which bounds the frequency range to be scanned by the mobile terminal.

Continuing on to step 102, if the mobile terminal 60 determines that a wireless system is not transmitting at the next frequency, the method returns to step 98 where it is again determined if the mobile terminal 60 has scanned all of the frequencies within the preselected frequency range. If, however, it is determined at step 102 that a wireless system is transmitting at the next frequency, the method proceeds to step 104 where the mobile terminal 60 acquires system identification information transmitted by the wireless system operating at the next scanned frequency. Continuing on to step 106, the mobile terminal 60 determines whether the system identification information acquired at the next frequency is recognizable. If it is determined at step 106 that the system identification information acquired at the next frequency is unrecognizable, the method returns to step 98 where it is again determined if the mobile terminal 60 has scanned all of the frequencies within the preselected frequency range. If, however, it is determined at step 106 that the system identification information acquired at the next frequency is recognizable, the method returns to step 86. The method then repeats steps 86 through 96, thereby selecting the system transmitting at the next frequency if it is determined that the system is the most preferred system on the list 64, storing the system identification information and the next frequency in memory as a preferred system if it determined that the system transmitting at the next frequency is one of the lesser preferred systems on the list 64, storing the system identification information and the next frequency in memory as a default system if the system transmitting at the next frequency is not on the list 64 and a default system has not yet been selected or ignoring the system transmitting at the next frequency if the system is not on the list 64 and a default system has already been selected. The method continues to detect and classify systems transmitting within the frequency range until all frequencies within the preselected frequency range have been selected.

Returning now to step 98, if the entire frequency range has been scanned and a most preferred system has not been detected, the method proceeds to step 108 where the mobile terminal 60 selects a preferred system for wireless communications from the lesser preferred systems determined to be available during scanning of the frequency range. Specifically, at step 108, the mobile terminal 60 selects, from the systems stored in memory as being available systems operating within the selected frequency range and ranked on the list 64 as lesser preferred systems, the available system having the highest ranking on the list 64 for wireless communications therewith. If, however, none of the lesser preferred systems on the list 64 have been identified as being available systems operating within the selected frequency range, the default system is selected. Having selected the preferred system within a geographical area, the method ends at step 82 with the mobile terminal 60 locking onto the selected preferred system.

In an alternate embodiment of the invention, it is contemplated that the above-described process is repeated after expiration of a selected time period, for example, fifteen minutes, after selection of a preferred system. For example, upon locking onto the preferred system, the mobile terminal 60 sets a timer if the preferred system is other than the most preferred system. When the timer times out upon expiration of the selected time period, the method restarts at step 70 with a scanning of the first frequency. Upon selection of a new preferred system which differs from the existing preferred system, the mobile terminal 60 will release the existing system and lock onto the new preferred system. Of course, however, the mobile terminal 60 will not seek out and lock onto a new preferred system if the existing preferred system is the most preferred system for the mobile terminal 60.

In the above-described embodiment of the invention, the periodic reselection of a preferred system is performed by the mobile terminal 60. It is further contemplated that, in accordance with an alternate embodiment of the invention, the periodic reselection of a preferred system is performed by the preferred system initially selected by the mobile terminal 60. More specifically, upon initial selection of a preferred system, the mobile terminal 60 may or may not transfer the contents of its list 64 to the selected preferred system. Based on this information or based on information from the network, the preferred system may then initiate a transfer of the mobile terminal 60 to a second, more preferred, system.

Continuing to refer to FIG. 2, the aforementioned "system identification information" will now be described in greater detail. As previously stated, the term refers to a number or value unique to a system. Regardless of operating standard, all systems periodically transmit a set of signals which may be received by any activated mobile terminal within signal range of the system. All such signals contain at least one component which may be used to identify the specific system transmitting the signal. Systems operating in accordance with a GSM-based standard periodically transmit a signal which includes MCC and MNC values. For GSM-based systems, it is contemplated that the system identification information is the combined MCC/MNC value disclosed herein. The mobile terminal 60 determines whether it is operating in its home system by comparing the acquired combined MCC/MNC value to the combined MCC/MNC value for its home system. If the mobile terminal 60 determines that it is not operating in its home system, the mobile terminal 60 compares the combined MCC/MNC value to the combined MCC/MNC values corresponding to systems on the list 64 to determine if the system transmitting the combined MCC/MNC value is a most preferred or lesser preferred system for the roaming mobile terminal 60.

Systems operating in accordance with the IS-95 transmits a signal which contains a system identification number (or "SID") and a 16-bit network identification number (or "NID"). To determine whether the mobile terminal 60 is operating in its home system, the terminal 60 compares the acquired SID with the SID for its home system. If it determined that the mobile terminal is operating outside its home system, the method compares the acquired NID value with the NIDs of the most preferred and/or lesser preferred systems set forth on the list 64 which operate in accordance with the IS-95 standard.

Finally, systems operating in accordance with the IS-136 standard periodically transmit a signal which contains a SID and a 16-bit private system identification number (or "PSID") To determine whether the mobile terminal 60 is operating in its home system, the terminal 60 compares the acquired SID with the SID for its home system. If it determines that the mobile terminal 60 is operating outside its home system, the method compares the acquired PSID value with the PSIDs of the most preferred and/or lesser preferred systems set forth on the list 64 which operate in accordance with the IS-136 standard.

While the value of specific elements of the signals periodically transmitted by systems operating in accordance with the IS-95, IS-136 or GSM-based standards have been specifically recited as the elements to be used to identify the systems, it should be clearly understood that the value of other elements specific to a particular standard are equally suitable for the uses contemplated herein if such alternate elements are also unique to each and every system operating in accordance with that standard. For example, other suitable elements for identifying a system operating in accordance with the IS-136 standard include, but are not limited to, the RSID, SOC, MCC and BSMC elements.

Thus, the exact configuration of the system identification information for any given system will vary, depending on the particular standard to which that system conforms and the elements of that standard selected for comparison with corresponding elements on the list 64. Furthermore, the list 64 which contains the most preferred and any number of lesser preferred systems for the mobile terminal 60 may be limited to systems which operate in accordance with any single standard or may include systems operating in accordance with differing standards. In any event, system identification information acquired for a transmitting system is compared to the most preferred and/or the lesser preferred systems which operate in accordance with the same standard for the transmitting system.

Figure 3:
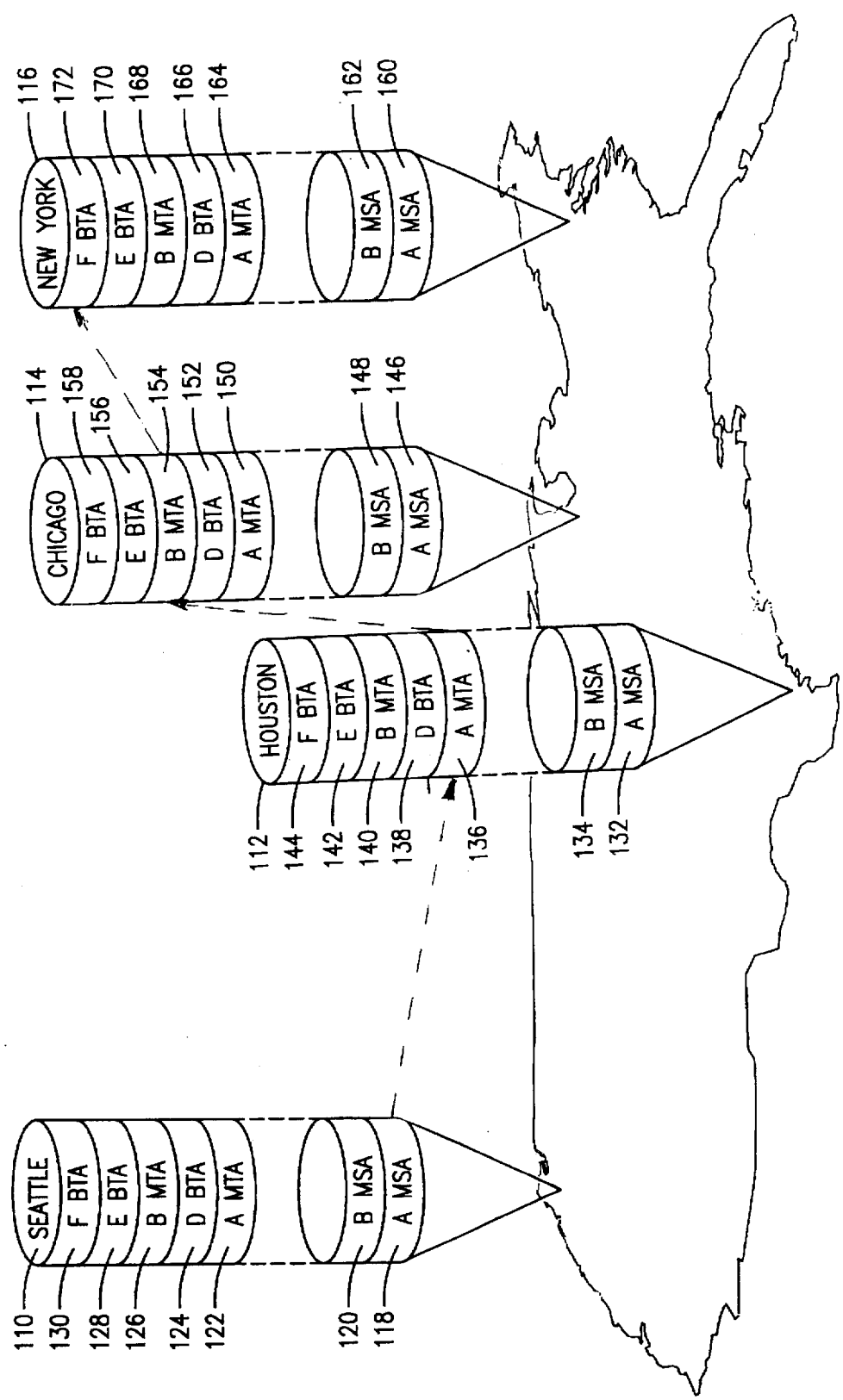
FIG. 3 is an illustration of an exemplary preferred system selection by a roaming mobile terminal.

Referring next to FIG. 3, an application of preferred system selectivity for a roaming mobile terminal will now be described in greater detail. In this application, Seattle, Houston, Chicago and New York are geographical areas in which respective first, second, third and fourth wireless environments 110, 112, 114 and 116 provide wireless communication therein. Each wireless environment 110, 112, 114, 116 is comprised of a plurality of wireless systems. The wireless environment 110 includes first and second cellular systems 118 and 120 (A metropolitan service area (or "MSA") and B MSA) and first, second, third, fourth and fifth PCS systems 122, 124, 126, 128 and 130 (A major trade area (or "MTA"), D basic trade area (or "BTA"), B MTA, E BTA and F BTA. Similarly, the wireless environment 112 includes first and second cellular systems 132 and 134 (A MSA and B MSA) and first, second, third, fourth and fifth PCS systems 136, 128, 140, 142 and 144 (A MTA, D BTA, B MTA, E BTA and F BTA), the wireless environment 114 includes first and second cellular systems 146 and 148 (A MSA and B MSA) and first, second, third, fourth and fifth PCS systems 150, 152, 154, 156 and 158 (A MTA, D BTA, B MTA, E BTA and F BTA) and the wireless environment 116 includes first and second cellular systems 160 and 162 (A MSA and B MSA) and first, second, third, fourth and fifth PCS systems 164, 166, 168, 170 and 172 (A MTA, D MTA, B MTA, E BTA and F BTA).

A service provider may have initially obtained a license to provide cellular service in a single geographical area but may have not had the financial resources to obtain cellular licenses in other geographical areas. Later, even with sufficient financial resources, the service provider may still have been shut out of other geographical areas due to a dwindling supply of available cellular licenses. However, acquisition of newly available PCS licenses will allow the service provider to enter additional geographical areas. For example, a single service provider may operate the cellular system 118 in Seattle, the PCS system 136 in Houston, the PCS system 154 in Chicago and the PCS system 170 in New York or have a unique roaming agreement with those systems. A subscriber enrolling with the service provider in Seattle will have the cellular system 118 designated as the home system for the mobile terminal. Previously, if the subscriber roamed to Houston, Chicago and New York, their mobile terminal would select the cellular systems 132, 146 and 160 in each of these cities. However, in accordance with the teachings of the present invention, by storing a list of preferred systems in the memory of the mobile terminal which ranks the commonly owned systems (the PCS systems 136, 154 and 172) higher than systems owned by others, for example, by ranking the PCS systems 136, 154 and 172 first, second and third, the subscriber's mobile terminal will select systems owned by the service provider over systems owned by others.

In the above-described embodiment of the invention, we have described a preferred system selection technique which is mobile terminal specific. In other words, we have presumed that the preferences of the subscriber and the mobile terminal are the same, a commonality which occurs when the network is limited to single subscriber terminals. Alternately, we contemplate that the preferred system selection techniques disclosed herein may be arranged to be subscriber specific, thereby making the techniques equally suitable for use with multiple-subscriber terminals.

Returning momentarily to FIG. 1, rather than being stored in the memory subsystem 62 of the mobile terminal 60, in an alternate embodiment of the invention, the list 64 may be stored on a user interface module (or "UIM") 66 (also referred to in Europe as a subscriber interface module (or "SIM")). When a subscriber activates a multiple subscriber mobile terminal, the subscriber inserts the UIM 66 into a multiple subscriber mobile terminal. In addition to reading the encoded data contained on the UIM 66 which is necessary to initiate wireless communications with an available system, the multiple subscriber mobile terminal also reads the list 64 from the UIM 66. This information will then be used in the manner previously described to select a preferred system for wireless communications. However, the selected system will be based upon the preferences of the subscriber and not the mobile terminal. Thus, if a second subscriber holding a UIM having an entirely different list of preferred systems stored thereon uses the same multiple subscriber terminal, the selected system will differ from that selected for the first subscriber. Conversely, if the first subscriber inserts the UIM 66 into a second multiple subscriber terminal, the second multiple subscriber terminal will select the same preferred system as would the first multiple subscriber terminal.

Thus, there has been described and illustrated herein, various techniques which enhance system selectivity capabilities for a mobile terminal. Such enhanced system selectivity will permit roaming mobile terminals to select systems which will provide advantages for the subscriber and/or service provider. For example, the subscriber will benefit by the mobile terminal having a preference for systems which provide better coverage or less expensive rates while the service provider will benefit by the mobile terminal having a preference for affiliated systems. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. For a mobile terminal having a memory subsystem, a method for selecting a preferred system for wireless communications therewith, comprising the steps of:

storing, in said memory subsystem of said mobile terminal, a system identifier and a rank for a most preferred system and each one of a plurality of lesser preferred systems;

scanning a range of operating frequencies to detect wireless systems operating within said range of frequencies;

each time a wireless system is detected during said scanning:

acquiring a system identifier for said detected wireless system;

comparing said acquired system identifier to said system identifier for said most preferred system;

if said acquired system identifier matches said system identifier for said most preferred system, determining that said detected wireless system is said most preferred system;

if said detected wireless system is determined to be said most preferred system for said mobile terminal, terminating said scanning and selecting said most preferred system for wireless communications with said mobile terminal;

comparing said acquired system identifier to said system identifier for said plurality of lesser preferred systems;

if said acquired system identifier matches said system identifier for one of said plurality of lesser preferred systems, determining that said detected wireless system is one of said plurality of lesser preferred systems for said mobile terminal and storing, in said memory subsystem of said mobile terminal, selection information which includes an operating frequency at which said detected wireless system transmits and said rank of said detected wireless system; and upon completion of said scanning, if no detected wireless system has been determined to be said most preferred system for said mobile terminal, selecting, using said selection information stored in said memory subsystem, a highest ranking lesser preferred system for wireless communications with said mobile terminal;

and further comprising the steps of:

prior to scanning said range of operating frequencies, scanning a home frequency to detect wireless systems operating at said home frequency;

if a wireless system operating at said home frequency is detected, determining if said detected wireless system is a home system for said mobile terminal;

if said detected wireless system operating at said home frequency is determined to be said home system for said mobile terminal, selecting said home system for wireless communications with said mobile terminal;

if said detected wireless system operating at said home frequency is determined to not be said home system for said mobile terminal, determining if said detected wireless system operating at said home frequency is said most preferred system or one of said plurality of lesser preferred systems for said mobile terminal;

if said detected wireless system operating at said home frequency is determined to be said most preferred system for said mobile terminal, selecting said detected wireless system operating at said home frequency for wireless communications with said mobile terminal; and if said detected wireless system operating at said home frequency is determined to be one of said plurality of lesser preferred systems for said mobile terminal, storing selection information for said detected wireless system operating at said home frequency in said memory subsystem of said mobile terminal.

2. For a mobile terminal having a memory subsystem and operable in at least one standard, a method for selecting a preferred system for wireless communications therewith, comprising the steps of:

storing, in said memory subsystem of said mobile terminal, a system identifier and a rank for a most preferred system and each one of a plurality of lesser preferred systems;

scanning a home frequency to detect wireless systems operating at said home frequency;

if a wireless system operating at said home frequency is detected, determining if said detected wireless system is operating in accordance with one of said at least one standard for said mobile terminal;

if said detected wireless system operating at said home frequency is determined to not be operating in accordance with one of said at least one standard for said mobile terminal, ignoring said detected wireless system not operating in accordance with one of said at least one standard for said mobile terminal;

if said detected wireless system operating at said home frequency is determined to be operating in accordance with one of said at least one standard for said mobile terminal, determining if said detected wireless system is a home system for said mobile terminal;

if said detected wireless system operating at said home frequency is determined to be said home system for said mobile terminal, selecting said home system for wireless communications with said mobile terminal;

if said detected wireless system operating at said home frequency is determined to not be said home system for said mobile terminal, determining if said detected wireless system operating at said home frequency is said most preferred system or one of said plurality of lesser preferred systems for said mobile terminal by acquiring a system identifier for said detected wireless system operating at said home frequency, comparing said acquired system identifier to said system identifier for said most preferred system, determining that said detected wireless system is said most preferred system if said acquired system identifier matches said system identifier for said most preferred system, comparing said acquired system identifier to said system identifier for said plurality of lesser preferred systems if said acquired system identifier fails to match said system identifier for said most preferred system and determining that said detected wireless system is one of said plurality of lesser preferred systems if said acquired system identifier matches said system identifier for one of said plurality of lesser preferred systems;

if said detected wireless system operating at said home frequency is determined to be said most preferred system for said mobile terminal, selecting said detected wireless system operating at said home frequency for wireless communications with said mobile terminal;

if said detected wireless system operating at said home frequency is determined to be one of said plurality of lesser preferred systems for said mobile terminal, storing an operating frequency at which said detected wireless system operating at said home frequency operates and said rank of said detected wireless system operating at said home frequency in said memory subsystem of said mobile terminal;

if said detected wireless system operating at said home frequency is determined to not be said home system or said most preferred system for said mobile terminal, scanning a range of operating frequencies to detect wireless systems operating within said range of frequencies;

each time a wireless system is detected during said scanning, determining if said detected wireless system is a most preferred system or one of a plurality of lesser preferred systems for said mobile terminal by determining if said detected wireless system is operating in accordance with one of said at least one standard for said mobile terminal, if said detected wireless system is determined to not be operating in accordance with one of said at least one standard for said mobile terminal, ignoring said detected wireless system not operating in accordance with said standard for said mobile terminal and continuing with said scanning of said range of frequencies, if said detected wireless system is determined to be operating in accordance with one of said at least one standard for said mobile terminal, acquiring a system identifier for said detected wireless system, comparing said acquired system identifier to said system identifier for said most preferred system, determining that said detected wireless system is said most preferred system if said acquired system identifier matches said system identifier for said most preferred system, comparing said acquired system identifier to said system identifier for said plurality of lesser preferred systems if said acquired system identifier fails to match said system identifier for said most preferred system and determining that said detected wireless system is one of said plurality of lesser preferred systems if said acquired system identifier matches said system identifier for one of said plurality of lesser preferred systems;

if said detected wireless system is determined to be said most preferred system for said mobile terminal, terminating said scanning and selecting said most preferred system for wireless communications with said mobile terminal;

if said detected wireless system is determined to be one of said plurality of lesser preferred systems for said mobile terminal, storing an operating frequency at which said detected wireless system transmits and said rank of said detected wireless system in said memory subsystem of said mobile terminal; and upon completion of said scanning, if no detected wireless system has been determined to be said most preferred system for said mobile terminal, selecting, using said selection information stored in said memory subsystem, a highest ranking lesser preferred system for wireless communications with said mobile terminal.

3. A method for selecting a preferred system for wireless communications according to claim 2 wherein said mobile terminal is operable in a selected one of the GSM-based, IS-95 and IS-136 standards and wherein said system identifier for said most preferred system and each one of said plurality of lesser preferred systems is either a combined MCC/MNC value, a NID value or a PSID value.

4. A method for selecting a preferred system for wireless communications according to claim 2 wherein the step of scanning a range of operating frequencies further comprises the steps of:

scanning a first range of operating frequencies to detect cellular systems operating within said first range of frequencies; and scanning a second range of operating frequencies to detect PCS systems operating within said second range of frequencies.

5. For a multiple subscriber mobile terminal having a memory subsystem and constructed to receive a user interface module having information stored therein, a method for subscriber selection of a preferred system for wireless communications between said preferred system and said multiple subscriber mobile terminal, comprising the steps of:

providing a user interface module having a home frequency, a range of frequencies, a system identifier for a most preferred system and each one of plurality of lesser preferred systems and a rank for said most preferred system and each one of said plurality of lesser preferred systems stored therein;

inserting said user interface module into said multiple subscriber mobile terminal to transfer, from said user interface module to said memory subsystem of said multiple subscriber mobile terminal, said home frequency, said range of frequencies, said system identifier for said most preferred system and each one of said plurality of lesser preferred systems and said rank for said most preferred system and each one of said plurality of lesser preferred systems;

scanning said range of operating frequencies to detect wireless systems operating within said range of frequencies;

each time a wireless system is detected during said scanning:

acquiring a system identifier for said detected wireless system;

comparing said acquired system identifier to said system identifier for said most preferred system;

if said acquired system identifier matches said system identifier for said most preferred system, determining that said detected wireless system is said most preferred system for said subscriber;

if said detected wireless system is determined to be said most preferred system for said mobile terminal, terminating said scanning and selecting said most preferred system for wireless communications with said multiple subscriber mobile terminal;

comparing said acquired system identifier to said system identifier for said plurality of lesser preferred systems;

if said acquired system identifier matches said system identifier for one of said plurality of lesser preferred systems, determining that said detected wireless system is one of said plurality of lesser preferred systems for said subscriber and storing, in said memory subsystem of said multiple subscriber mobile terminal, selection information which includes an operating frequency at which said detected wireless system transmits and said rank of said detected wireless system; and upon completion of said scanning, if no detected wireless system has been determined to be said most preferred system for said subscriber, selecting, using said selection information stored in said memory subsystem, a highest ranking lesser preferred system for wireless communications with said multiple subscriber mobile terminal;

and further comprising the steps of:

prior to scanning said range of operating frequencies, scanning said home frequency to detect wireless systems operating at said home frequency;

if a wireless system operating at said home frequency is detected, determining if said detected wireless system is a home system for said subscriber;

if said detected wireless system operating at said home frequency is determined to be said home system for said subscriber, selecting said home system for wireless communications with said multiple subscriber mobile terminal;

if said detected wireless system operating at said home frequency is determined to not be said home system for said subscriber, determining if said detected wireless system operating at said home frequency is said most preferred system or one of said plurality of lesser preferred systems for said subscriber;

if said detected wireless system operating at said home frequency is determined to be said most preferred system for said subscriber, selecting said detected wireless system operating at said home frequency for wireless communications with said multiple subscriber mobile terminal; and if said detected wireless system operating at said home frequency is determined to be one of said plurality of lesser preferred systems for said subscriber, storing selection information for said detected wireless system operating at said home frequency in said memory subsystem of said multiple subscriber mobile terminal.

6. For a mobile terminal having a memory subsystem, a method for selecting a preferred system for wireless communications therewith, comprising the steps of:

scanning a home frequency to detect wireless systems operating at said home frequency;

if a wireless system operating at said home frequency is detected, determining if said detected wireless system is a home system for said mobile terminal;

if said detected wireless system operating at said home frequency is determined to be said home system for said mobile terminal, selecting said home system for wireless communications with said mobile terminal;

if said detected wireless system operating at said home frequency is determined to not be said home system for said mobile terminal, determining if said detected wireless system operating at said home frequency is a most preferred system or one of a plurality of lesser preferred systems for said mobile terminal;

if said detected wireless system operating at said home frequency is determined to be said most preferred system for said mobile terminal, selecting said detected wireless system operating at said home frequency for wireless communications with said mobile terminal;

if said detected wireless system operating at said home frequency is determined to be one of said plurality of lesser preferred systems for said mobile terminal, storing selection information for said detected wireless system operating at said home frequency in said memory subsystem of said mobile terminal and scanning a range of operating frequencies to detect wireless systems operating within said range of frequencies;

each time a wireless system is detected during said scanning, determining if said detected wireless system is said most preferred system or one of said plurality of lesser preferred systems for said mobile terminal;

if said detected wireless system is determined to be said most preferred system for said mobile terminal, terminating said scanning and selecting said most preferred system for wireless communications with said mobile terminal;

if said detected wireless system is determined to be one of said plurality of lesser preferred systems for said mobile terminal, storing selection information for said detected wireless system in said memory subsystem of said mobile terminal; and upon completion of said scanning, if no detected wireless system has been determined to be said most preferred system for said mobile terminal, selecting, using said selection information stored in said memory subsystem, a highest ranking lesser preferred system for wireless communications with said mobile terminal.

7. For a multiple subscriber mobile terminal having a memory subsystem and constructed to receive a user interface module having information stored therein, a method for subscriber selection of a preferred system for wireless communications between said preferred system and said multiple subscriber mobile terminal, comprising the steps of:

providing a user interface module having a home frequency, a system identifier for a most preferred system and each one of a plurality of lesser preferred systems and a rank for said most preferred system and each one of said plurality of lesser preferred systems stored therein;

inserting said user interface module into said multiple subscriber mobile terminal to transfer, from said user interface module to said memory subsystem of said multiple subscriber mobile terminal, said home frequency, said system identifier for said most preferred system and each one of said plurality of lesser preferred systems and said rank for said most preferred system and each one of said plurality of lesser preferred systems;

scanning said home frequency to detect wireless systems operating at said home frequency;

if a wireless system operating at said home frequency is detected, determining if said detected wireless system is a home system for said subscriber;

if said detected wireless system operating at said home frequency is determined to be said home system for said subscriber, selecting said home system for wireless communications with said multiple subscriber mobile terminal;

if said detected wireless system operating at said home frequency is determined to not be said home system for said subscriber, determining if said detected wireless system operating at said home frequency is said most preferred system or one of said plurality of lesser preferred systems for said subscriber;

if said detected wireless system operating at said home frequency is determined to be said most preferred system for said subscriber, selecting said detected wireless system operating at said home frequency for wireless communications with said multiple subscriber mobile terminal;

if said detected wireless system operating at said home frequency is determined to be one of said plurality of lesser preferred systems for said subscriber, storing selection information for said detected wireless system operating at said home frequency in said memory subsystem of said multiple subscriber mobile terminal and scanning a range of operating frequencies to detect wireless systems operating within said range of frequencies;

each time a wireless system is detected during said scanning, determining if said detected wireless system is said most preferred system or one of said plurality of lesser preferred systems for said subscriber;

if said detected wireless system is determined to be said most preferred system for said subscriber, terminating said scanning and selecting said most preferred system for wireless communications with said multiple subscriber mobile terminal;

if said detected wireless system is determined to be one of said plurality of lesser preferred systems for said subscriber, storing selection information for said detected wireless system in said memory subsystem of said multiple subscriber mobile terminal; and upon completion of said scanning, if no detected wireless system has been determined to be said most preferred system for said subscriber, selecting, using said selection information stored in said memory subsystem, a highest ranking lesser preferred system for wireless communications with said multiple subscriber mobile terminal.

* * * * *